Jan. 9, 1962    K. H. STEIGERWALD    3,016,449
METHOD FOR WELDING A COVER PLATE TO A STRUCTURAL
PART COMPOSED OF STRIPS OF ANY SHAPE
Filed Oct. 2, 1959      3 Sheets-Sheet 1

INVENTOR

KARL HEINZ STEIGERWALD

BY Emery Whittemore Sander & Sheban

Jan. 9, 1962   K. H. STEIGERWALD   3,016,449
METHOD FOR WELDING A COVER PLATE TO A STRUCTURAL
PART COMPOSED OF STRIPS OF ANY SHAPE
Filed Oct. 2, 1959   3 Sheets-Sheet 3
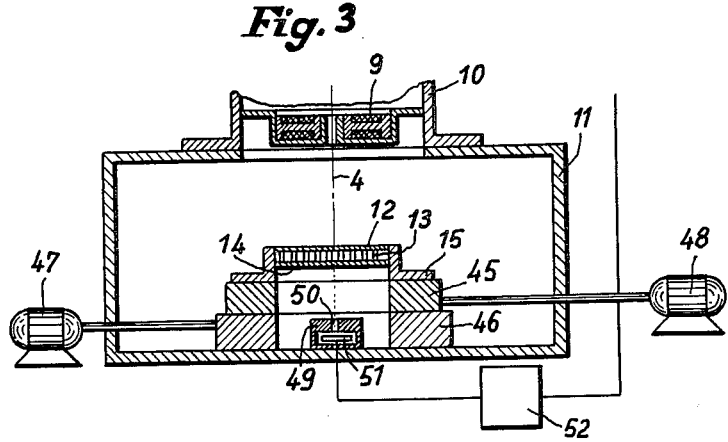
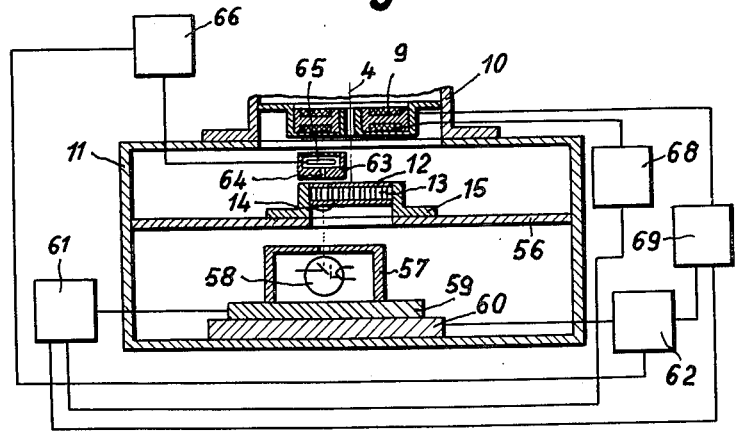
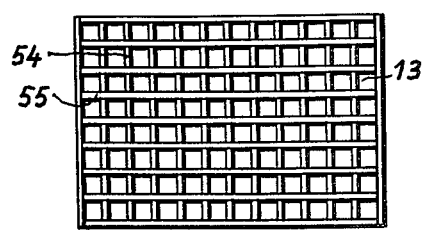
INVENTOR
KARL HEINZ STEIGERWALD
BY *Emery Whittemore Sandoe & Graham*

United States Patent Office 3,016,449
Patented Jan. 9, 1962

3,016,449
METHOD FOR WELDING A COVER PLATE TO A STRUCTURAL PART COMPOSED OF STRIPS OF ANY SHAPE
Karl Heinz Steigerwald, Heidenheim (Brenz), Germany, assignor to Carl Zeiss, Heidenheim (Brenz), Wurttemberg, Germany
Filed Oct. 2, 1959, Ser. No. 843,954
Claims priority, application Germany Oct. 2, 1958
12 Claims. (Cl. 219—117)

This invention relates to a method and apparatus for welding a cover plate to a structural part composed of strips of any shape.

In such welding applications, it is necessary to apply the weld seam in such a manner that it follows the shape of the strip as accurately as possible and, therefore, that the strips are welded to the cover plate as far as possible over their entire length. Such welding cannot be effected or at least not be effected without extremely great difficulties with the welding processes customary heretofore.

The art is familiar with the use of an electron beam to supply the energy necessary to weld special materials such as zirconium. The welding is performed in a high vacuum.

The art is also familiar with the use of welding by a beam of charged particles in which the beam intensity is pulse-modulated. Pulse modulated beams have many advantages, residing particularly in the fact that very fine seams can be produced.

However, when welding a cover plate to a structural part composed of strips, such as the welding of a skin to a honeycomb, the structural part is hidden. Thus, there is difficulty in properly guiding the beam for the desired welding. Merely guiding the beam in a predetermined pattern over the cover in accordance with the supposed location of the structural part is not satisfactory due to inevitable variations of the structural part dimensions and the difficulty of positioning the part with the requisite accuracy.

It is, therefore, the primary object of this invention to provide an improved method and means for the welding of a cover to a structural part composed of strips.

It is a further object of this invention to provide an improved method and means for detecting the location of a structural part hidden by a cover and welding the cover to structural part at the detected location by a beam of charged particles.

In accordance with these objects there is provided, in a preferred embodiment of this invention, means to scan the cover plate and structural part composed of strips. A beam of charged particles is controlled in response to the scan so that the beam strikes the cover plate with an intensity sufficient for welding only at those points on the cover plate below which a strip lies. For the penetration of the workpiece by the scanning means, X-rays or the radiation emitted by a radioactive preparation can be used as the scanning beam. By means of these rays, it is possible to penetrate and scan even non-transparent cover plates so that the weld seam can be laid in such a manner that it follows as closely as possible the strip shape of the structural part to be welded.

In order to lay the weld seam precisely along the strip of the structural part which is to be welded to the cover plate, the source of radiation and the associated receiver or sensor are advisedly caused to travel along the strip of the structural part to be welded by means of a servomechanism controlled by the scanning sensor. The co-ordinate values of the scanner position is fed to a memory which, after an adjustable time delay controls the deflection of the beam of charge carriers in accordance with said co-ordinate values. As memory there can be used in this connection for instance an endless magnetic tape on which the voltage values corresponding to the co-ordinate values are recorded and from which these values are then read after a period of time, the length of which can be adjusted. It is also possible, instead of using a magnetic tape, to use a storage device which has become known under the name "memory tube."

Since the welding is to be carried out with the greatest possible speed, it is necessary to develop all control devices in such a manner that their recovery time constant is as small as possible. It is, therefore, advisable to use electronic means at all points.

In those applications where an intermittent weld scan is desired (as opposed to a continuous weld seam along the strip), it is advantageous to move the source of radiation and the associated receiver in predetermined scanning pattern. In this case, the deflection systems of the beam of charge carriers are advisedly coupled with the device which moves the receiver in such a manner that the beam of charge carriers follows the receiver at a predetermined distance from it. In this way, the receiver is prevented from being struck by the beam of charge carriers and thereby damaged. By means of a relay coupled to the sensor, the beam of charge carriers is placed in action with the time lag corresponding to its distance from the receiver thereby to impinge on the cover plate when a strip lies below the point of impingement on the cover plate.

If the beam of charge carriers is inclined somewhat with respect to the surface of the workpiece, damage to the receiver by the beam of charge carriers is precluded. In this case, the deflecting systems of the beam of charge carriers are advisedly so coupled with the device moving the sensor that the point of impact of the beam of charge carriers always coincides with the position of the scanning beam. In this case also, the beam of charge carriers is only placed in action via a relay connected with the receiver when a strip lies below its point of impact on the cover plate.

In accordance with another development of the method, the entire workpiece is moved in predetermined manner with respect to a stationary source of radiation and associated receiver. In this case, the beam of charge carriers is placed into action via a relay connected with the receiver when a strip is present below its point of impact on the cover plate. In this case, the arrangement can be such that the point of impact of the beam of charge carriers coincides with the place of passage of the radiation. It is, however, also possible for the receiver and the point of impact of the beam of charge carriers to be separated in space from each other. If this is the case, then the signal supplied by the receiver is fed to the beam generating system via a storage device with the time delay corresponding to the distance between the receiver and the point of impact of the beam of charge carriers.

In accordance with a further development of the new process, the entire workpiece is moved in predetermined manner with respect to the stationary beam of charge carriers, the intensity of which is reduced below that necessary for welding. The beam of charge carriers does not produce any fabricating or processing work at the point of impact, but does cause the emission of X-rays. The X-rays are detected by a receiver which, by means of a relay, increases the intensity of the beam charge carrier to a welding intensity only when a strip is located below the point of impact of the beam of charge carriers on the cover plate.

An apparatus for the carrying out of the new method contains a beam generating system, an electromagnetic lens for focussing the beam of charge carriers on the workpiece and a deflecting system located below said lens. If X-rays are to be used for the radiation of the workpiece, it is advisable to arrange an X-ray source below the workpiece, and to locate the receiver associated with said X-ray source above the workpiece. This receiver is then connected with switch means which serve to control the deflection system and/or the beam generating system. In certain cases it is advisable, instead of using an X-ray source, to apply a layer of radioactive material on the surface, adjacent the cover plate, of the structural part composed of strips of any shape. Above the cover plate, a receiver is then provided which is moved relative to the workpiece and by suitable switch means, controls the deflection system and/or the beam generating system of the instrument.

The invention will be more easily understood by reference to the following description, taken in conjunction with the accompanying drawings, of which:

FIGURE 3 is a sectioned view of another embodiment of this invention;

FIGURE 4 is a partially sectioned view of still another embodiment; and

FIGURE 5 is a top view of a structural part composed of strips.

Figure 1:
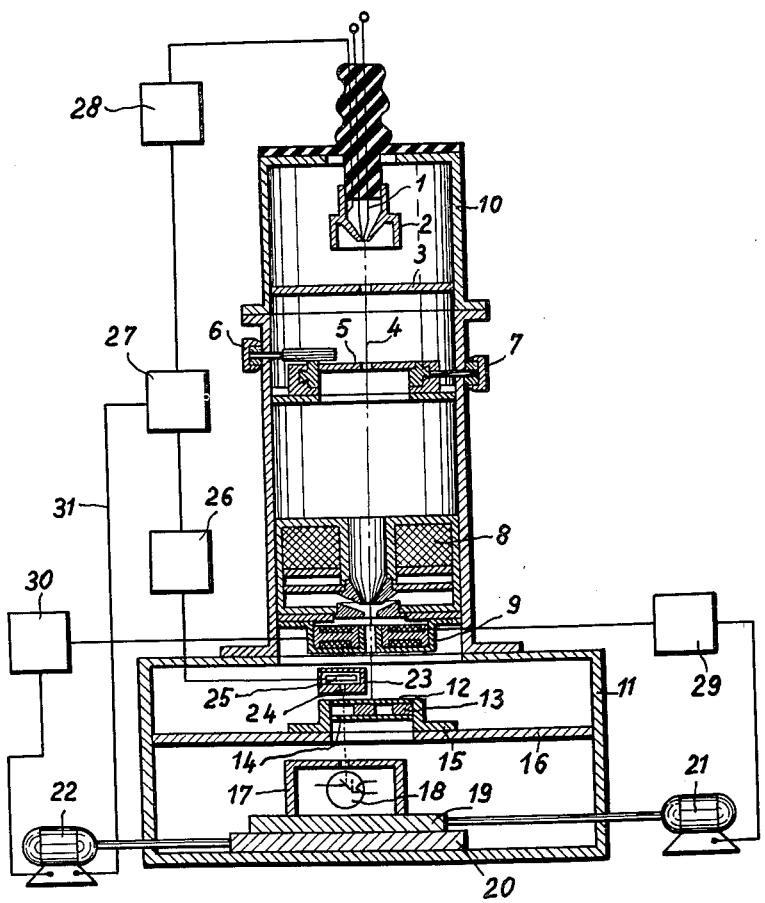
FIGURE 1 is a sectioned view of one embodiment of this invention.

In FIGURE 1 there is shown an electron beam welder comprising a cathode 1, a control or modulator electrode 2 and an anode 3. The electron beam 4 produced by this system passes through a beam-shaping diaphragm 5 which is adjustably positioned by means of knobs 6 and 7. Below the diaphragm 5 there is provided an electromagnetic lens 8 to focus the electron beam 4 on the workpiece to be welded. A deflecting system 9 consisting of four electromagnetic coils is arranged below the lens 8. All structural parts are contained within a grounded housing 10.

Adjoining the housing 10, there is located the working chamber 11. In this chamber there is supported the workpiece which consists of a cover plate 12, a structural part 13 composed of strips of any desired shape and a bottom plate 14. The workpiece is held in position by the jaws of the clamping device 15 which is mounted on a horizontal partition 16. Below the partition 16, there is arranged a housing 17 which contains an X-ray source 18 and which has an exit pinhole to limit X-rays emergence to a small beam. The housing 17 is supported on a compound slide 19, 20, shown schematically. The electric motor 21 serves for the transverse displacement (e.g. into and out of the paper plane) of the X-ray source 18 while the motor 22 serves for the longitudinal displacement (e.g. in the paper plane) of the X-ray source 18.

Above the workpiece 12, 13, 14, there is arranged a housing 23 provided with a vertical aperture 24 to restrict the sensor to a narrow field of view suitable for accurate position scanning. The housing contains a receiver 25 which is sensitive to X-rays. The housing 23 is connected (in a manner not shown in the drawing) with the housing 17 of the X-ray source 18 so that the receiver and source move simultaneously.

Signals developed by the receiver 25 are coupled to an amplifier 26 and, after amplification thereby, are coupled to a storage device 27. A pulse generator is coupled to the control electrode 2 to modulate the electron beam. The pulse generator is triggered by the signals from the storage device 27 to which it is coupled.

To synchronize beam deflection with movement of the scanning sensor assembly comprising the X-ray source 17 and receiver 23, deflection signals responsive to angular movement of the sensor drive motors are generated. Signal generation may conveniently be made by a suitable potentiometer coupled to the drive motors. A signal proportional to transverse displacement of table 19 is supplied for the transverse drive motor 21. The signal is amplified by amplifier 29 and coupled to the transverse deflection coils of the deflection system 9. Similarly the longitudinal drive motor provides a signal proportional to longitudinal displacement of the table, which signal is amplified by amplifier 30 and coupled to the longitudinal deflection coils of the deflection system 9.

The manner of operation of the apparatus shown in FIGURE 1 is as follows:

The control electrode 2 is biased to cut off, so that no electron beam 4 is produced. The X-rays from source 18 pass through the workpiece 12, 13, 14 and are attenuated to a greater or lesser extent, depending on whether a strip of the structural part 13 is or is not present in the path of the X-ray in question. The radiation emerging perpendicularly to the surface of the cover plate 12 of the workpiece is stopped-down by the aperture 24 and impinges on the receiver 25. The signal generated by the receiver is modulated in accordance with beam attenuation and, thus, can be used as an information signal to locate the presence of a structural part 13. If a strip of the structural part 13 is located precisely vertically below the aperture 24, the voltage supplied by the receiver is a minimum. This voltage is amplified in the amplifier 26 and fed to a storage device 27. This storage device 27 may comprise, for instance, a magnetic tape storage device or can consist of a so-called memory tube. A voltage proportional to the speed of the longitudinal drive is coupled to the storage device 27 from the motor 22 over lead 31. This voltage determines the time delay between the generation of the control signal by the receiver 25 and application of the corresponding triggering signal to the pulse generator 28; as for example, by varying the tape transport speed of a magnetic tape storage device.

Since the deflection system is controlled in response to the sensor movement, the impingement point of the electron beam follows the scan at a precisely determined longitudinal separation and with no transverse separation. During movement of the scan, it is, therefore, only necessary to transfer the longitudinal separation to a time base and trigger the electron beam after such predetermined time delay. By so doing, the beam will impinge on the cover plate when a strip is beneath the point of impingement.

For example, if the sensor 25 senses that, at time $t_1$ a strip of the structural part 13 is below the sensor. The pulse generator 28 is triggered at time $t_1 + \Delta t$. The time delay is related to the speed of the longitudinal scan by coupling 31 so that the electron beam 4 impinges on the point which was under the scanning sensor 25 at time $t_1$.

In many applications it is convenient to move the workpiece in a predetermined welding pattern under the point of impingement of an undeflected beam. In such applications the embodiment shown in FIGURE 2 may advantageously be employed.

Figure 2:
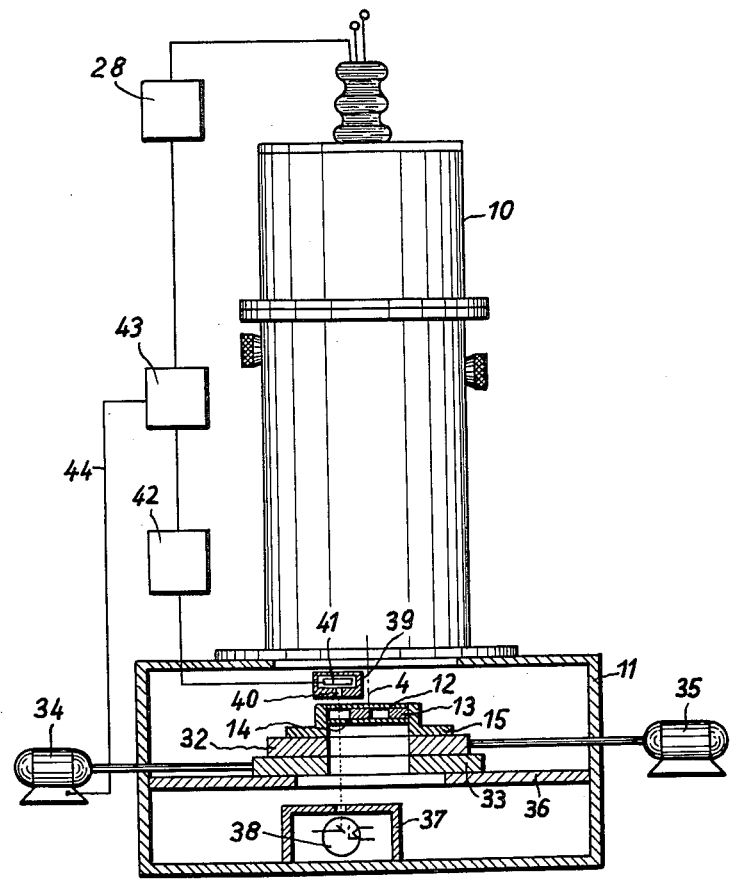
FIGURE 2 is a partially sectioned view of another embodiment of this invention.

In FIGURE 2 there is shown the workpiece 12, 13, 14 movably supported on a compound table 32, 33 which is shown schematically. An electric motor 34 is provided for longitudinal displacement of the workpiece; an electric motor 35 is provided for transverse displacement of the workpiece. The compound slide itself is supported on a partition 36 below which a stationary housing 37 is arranged. The housing 37 contains a stationary X-ray tube 38. Above the workpiece 12, 13, 14 there is rigidly arranged a housing 39 provided with an aperture 40, which housing contains a receiver 41. This receiver is connected via an amplifier 42 with a storage device 43.

The manner of operation of the device shown here is as follows:

The workpiece 12, 13, 14 is displaced by the electric motors 34 and 35 with respect to the X-ray source 38 and the stationary receiver 41. The signals supplied by the receiver 41 are amplified at 42, stored in the storage device 43 and after a period of time Δt, transmitted to the pulse generator to generate a pulse overcoming the bias on the control electrode and initiating an electron beam.

The period of time Δt corresponds to the distance, transferred to a time scale, between the gap 40 and the field point of impact of the electron beam 4. A control voltage which determines the time delay Δt is coupled to the storage device 43 from the motor 34 over lead 44.

In the case of the apparatus shown in FIGURE 3, the work piece 12, 13, 14 is supported on a compound table 45, 46 which is moved by means of the electric motors 47 and 48. On the bottom of the housing 11, there is affixed a shielded housing 49 which contains an aperature 50. The housing 49 encloses a receiver 51 which is sensitive to X-rays. The signal from the receiver is coupled through an amplifier 52 directly to the source of bias voltage for the control electrode in amplitude controlling relationship.

The manner of operation of the device shown here is as follows:

The bias voltage of the control electrode 2 is initially adjusted so that the intensity of the electron beam 4 is not sufficient to effect welding. The electron beam 4 impinging on the cover plate 12 will, however, generate X-rays, the amplitude of which is converted into voltage values by the receiver 51. The intensity of the X-rays impinging on the receiver 51 is dependent on whether a strip of the structural part 13 lies below the point of impact of the electron beam 4 on the cover plate 12. The control signals produced in the receiver 51 are amplified in the amplifier 52 and automatically reduce the bias voltage of the modulator electrode 2 to such an extent that the intensity of the electron beam 4 rises to the operating value. It will be noted that the signal from the receiver could be used to trigger a pulse generator for a pulse-modulated beam, as explained in connection with the embodiment of FIGURE 1.

In many applications it is desirable that the cover be welded to the strip of the structural part over the entire length of the strip. In such applications the embodiment shown in FIGURE 4 may advantageously be employed.

In FIGURE 4 there is shown a sensor drive apparatus adapted to trace the position of the strips of the structural part and to control the impingement of the electron beam in response thereto so that the weld seam follows the strips and, thus, that the strip is welded to the cover over the entire strip length.

For example, the structural part 13 may be similar to that shown in FIGURE 5, consisting of transverse strips 54 and lengthwise strips 55. The weld seam laid by the apparatus of FIGURE 4 should follow the course of strips 54 and 55 on the cover plate 12.

In the apparatus shown in FIGURE 4, the workpiece 12, 13, 14 which is to be worked is firmly supported on a horizontal partition 56 arranged in the working chamber 11. Below the horizontal partition 56 there is a housing 57 which contains an X-ray source 58. The housing 57 is supported on a compound table 59, 60, shown schematically, which is displaced by means of two motion-transmission devices 61, 62 shown schematically. Above the cover plate 12 of the workpiece there is arranged a housing 63, which is provided with an aperture 64. The housing 63 contains a receiver 65, which is connected with an amplifier 66 and is rigidly connected, in a manner not shown, with a housing 57 so that the X-ray source 58 and the receiver 65 always carry out the same movements. The receiver 65 consists, in the case shown here, of for instance a 2 element cell to generate control signals having directional characteristics.

The manner of operation of the device shown in FIGURE 4 is as follows:

The X-ray source 58 with associated receiver 65 is displaced longitudinally via the motion-transmitting device 61. The motion-transmitting device 61 at the same time supplies a voltage which is proportional to the amount of the displacement. This voltage is fed to an amplifier 68 and passes from there to the corresponding deflection coils of the deflection system 9. By means of this voltage, the electron beam 4 is caused to follow up in such a manner that it always remains at the same distance in longtitudinal direction from the receiver 65.

The voltage supplied by the receiver 65 is amplified at 66 and fed to a motion-transmitting device 62 which displaces the X-ray source 58 in transverse direction. The servo system 65, 66, 62 is so developed that the aperture 64 of the housing 63 arranged in front of the receiver 65 is always guided along the strips of the structural part 13. This is assured for instance even if said strips are of any shape and particularly even if they form an angle with the direction of the longitudinal displacement. At the same time, the motion transmitting device 62 supplies a voltage which is proportional to the amount of the transverse displacement. This voltage is fed to a storage device 69 and passes from there, after a period of delay Δt to the transverse deflecting coils of the deflection system 9. The period of time Δt corresponds to the distance, converted to a time scale, between the gap 64 and the point of impingement of the electron beam 4. In order to be certain of selecting the time Δt correctly even in case of an unintentional change of the speed of advance, a voltage is simultaneously supplied by the displacement device 61, which is proportional to the speed of displacement. This voltage is fed to the storage device 69 and determines the delay time Δt.

Instead of the X-ray tubes shown in FIGURES 1, 2 and 4, radioactive preparations can also be employed. The associated receivers are in such case so developed that they are sensitive to the rays emitted by such preparations.

It is for instance also possible to convert the device shown in FIGURE 2 in the manner that the surface of the structural part 13 which rests against the cover plate 12 is provided with a layer of radioactive substance. In this case, the X-ray tube 38 is thus superfluous and the receiver 41 is so connected that it triggers the pulse generator 28 via the amplifier 42 and the storage device 43, when a voltage maximum is produced.

If only specific points of the structural part composed of strips are to be welded to the cover plate, it is advisable that only these points be provided with a radioactive coating. The welding beam in such case removes merely the radioactive path without affecting the other points of the workpiece.

The invention may be variously embodied and modified within the scope of the subjoined claims.

What is claimed is:

1. The method of welding a cover plate to a structural part assembled of strips of any shape along said strips, consisting of the steps of scanning said structural part and the cover plate with a beam which passes through the plate, detecting the modulation of the scanning beam by a sensor, and, in response to said detection, controlling the intensity and deflection of a beam of charge carriers so that the beam impinges only on those points of the cover plate below which a strip is located with an intensity sufficient for welding.

2. The method according to claim 1 in which said cover plate is opaque, and in which the scanning beam is a beam of X-rays.

3. The method according to claim 1 in which said cover plate is opaque and in which the scanning beam comprises radiation emitted by a radioactive preparation.

4. The method according to claim 1, which includes guiding the scanning beam over the strips of the structural part, deriving signals responsive to the co-ordinate displacement defining the position of the scanning beam, and deflecting the beam of charge carriers in response to said signals.

5. The method according to claim 1 in which the scanning beam and the sensor are moved in a predetermined pattern, the deflection systems of the beam of charge carriers are coupled with the motion-transmitting device of the sensor in such a manner that the beam of charge carriers follows the sensor at a predetermined distance therefrom, and, by means of a relay connected with the sensor, the beam of charge carriers is placed in action with the time delay corresponding to its distance from the sensor to impinge upon the cover plate with a welding intensity when a strip is located below the point of impingement on the cover plate.

6. The method according to claim 1 in which the scanning beam and the sensor are moved in a predetermined pattern, the deflection systems of the beam of charge carriers are coupled with the motion-transmitting device of the sensor so that the point of impact of the beam of charge carriers always coincides with the place of penetration of the scanning beam and, by means of a relay connected with the sensor, the beam of charge carriers is only then placed in action when a strip is located below its point of impact on the cover plate.

7. The method according to claim 1 in which the cover plate and structural part are moved in predetermined pattern with respect to a stationary scanning beam and sensor, and in response to modulation of the scanning beam detected by said sensor, the beam of charge carriers is only placed in action when a strip is located below its point of impact on the cover plate.

8. The method according to claim 7, which includes introducing a time delay between the detection of the scanning beam modulation and placing the beam of charged particles into action and varying the time delay in accordance with the rate of movement of cover plate so that the time delay corresponds to the distance of the sensor from the point of impact of the beam of charge carriers.

9. The method according to claim 1 in which the plate and structural part are moved in predetermined manner with respect to the stationary beam of charge carriers, the intensity of which is reduced to below the intensity necessary for welding, and in response to detection of the modulation of the X-rays emanating from the point of impact of said beam of charge carriers increasing the intensity of the beam of charge carriers to the welding intensity only when a strip is located below its point of impact on the cover plate.

10. Apparatus for welding a work piece including a cover and a structural part composed of strips comprising means for generating a beam of charge carriers, an electromagnetic lens for focusing the beam of charge carriers on the workpiece, a deflection system for deflecting said focussed beam, an X-ray source positioned on one side of said workpiece to irradiate the workpiece, a sensor positioned on the other side of said workpiece to detect modulation of said X-rays, and means responsive to said detection to deflect said beam to impinge only on those points of the cover below which a strip is located with an intensity sufficient for welding.

11. Apparatus for welding a workpiece including a cover plate and a structural part composed of strips comprising means for generating a beam of charge carriers, an electromagnetic lens for focussing the beam, a deflection system for deflecting said focussed beam, said structural part having a layer of radioactive material applied to the surface adjacent the cover plate, a sensor mounted above said cover plate to detect intensity variation in the radiation emitted by said material, and means responsive to said detected intensity variation to regulate the deflection and intensity of the beam of charge carriers to impinge only on those points on the cover below which one of said strips is located with an intensity sufficient for welding.

12. An apparatus according to claim 11 in which the radioactive material is applied only to those points on the structural part which are to be welded to the cover by the welding beam.

References Cited in the file of this patent

UNITED STATES PATENTS 2,819,380     Eaton                        Jan. 7, 1958